May 15, 1951     O. E. NELSON     2,552,806
UTENSIL HANDLE
Filed April 10, 1946
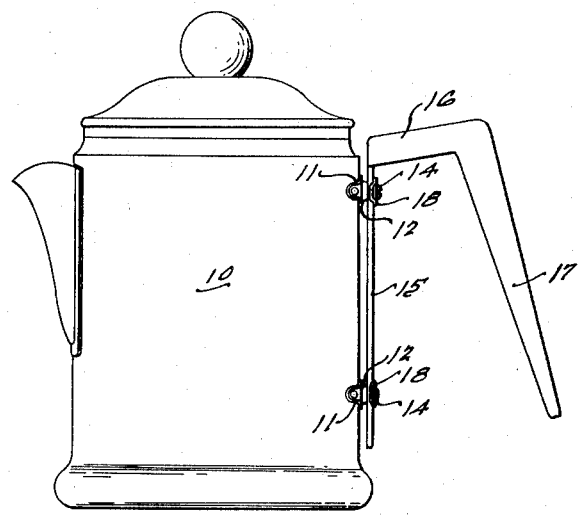
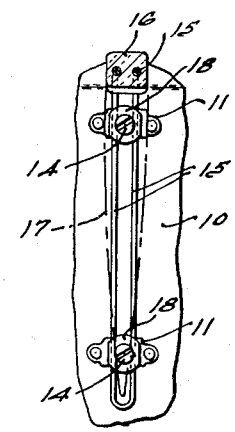
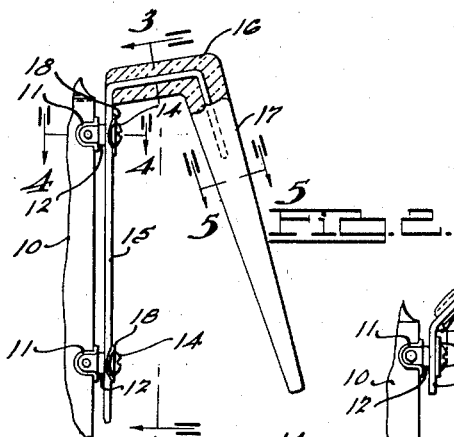
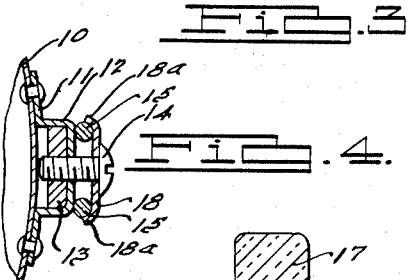
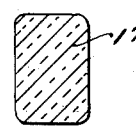
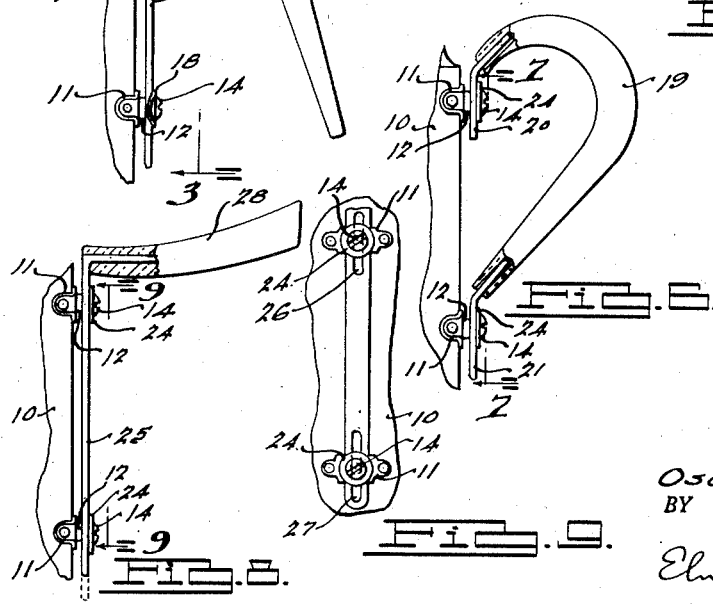
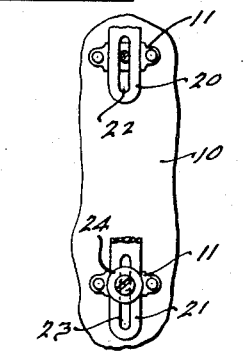
INVENTOR.
Oscar E. Nelson
BY
Elmer Jamison Gray
ATTORNEY.

Patented May 15, 1951

2,552,806

UNITED STATES PATENT OFFICE 2,552,806

UTENSIL HANDLE

Oscar E. Nelson, Detroit, Mich.

Application April 10, 1946, Serial No. 661,136

3 Claims. (Cl. 16—116)

This invention relates to handles for containers and in particular to handles of the adjustable type for containers such as coffee percolators or the like.

Conventional or standard coffee percolators are generally provided with handles having hand grip portions which are positioned closely adjacent a side of the percolator. When such a percolator is used over an open burner it is not unusual to find the hand grip portion of the handle so hot that it cannot be grasped by the hand without the use of some additional device such as a cloth or asbestos pot holder. Furthermore, the conventional percolator handle is usually formed of wood or plastic material which after a period of use over an open burner burns away leaving the pecolator without a handle. Unless a replacement of necessary dimensions is readily available the utility of the percolator is greatly impaired. It is not uncommon to find in a household a coffee percolator or similar container discarded for want of a replacement handle which the owner has not been able to purchase.

It is an object of the invention, therefore, to provide an adjustable handle for containers, such as coffee percolators or the like, which is simple and inexpensive and which may be easily attached to spaced handle supports on said containers or percolators, said handle being further adapted for vertical adjustment thereon.

It is another object of the invention to provide a single adjustable handle so constructed as to be capable of interchangeable attachment to containers, coffee percolators and the like having fixed handle supports vertically spaced thereon at varying distances apart.

A further object of the invention is to provide an adjustable handle which may be interchangeably applied to coffee percolators and the like having fixed handle attaching devices located on the side of the percolators at varying distances apart, the present improved handle being provided with vertically spaced metallic attaching members constructed so as to register with the attaching devices on the percolators regardless of the different spacing thereof and also being provided with a hand grip portion of low heat conductivity positioned relatively remote from the flame when the percolator is placed over an open burner.

Other objects of this invention will appear in the following description and appended claims, reference being had to the accompanying drawings forming a part of this specification wherein like reference characters designate corresponding parts in the several views.

Fig. 1 is a side elevation view of a coffee percolator with the present improved adjustable handle mounted in operative position thereon.

Fig. 2 is a side elevation view partly in section of the handle shown in Fig. 1.

Fig. 3 is a front elevation view partly in section taken through lines 3—3 of Fig. 2 looking in the direction of the arrows.

Fig. 4 is a section taken through lines 4—4 of Fig. 2 looking in the direction of the arrows.

Fig. 5 is a section taken through lines 5—5 of Fig. 2 looking in the direction of the arrows.

Fig. 6 is a side elevation view partly in section showing another embodiment of the handle shown in Fig. 1.

Fig. 7 is a fragmentary front elevation view taken through lines 7—7 of Fig. 6 looking in the direction of the arrows.

Fig. 8 is a side elevation view partly in section showing still another embodiment of the handle shown in Fig. 1.

Fig. 9 is a fragmentary front elevation view taken through lines 9—9 of Fig. 8 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings wherein I have illustrated by way of example several embodiments of the invention there is shown at 10 a coffee percolator or container of conventional make. It should be understood, however, that while the present invention is illustrated in connection with a coffee percolator the invention may be readily adapted for use with other containers, servers or utensils without departing from the concept of the invention.

Attached to the side of the container 10 and spaced vertically thereon with respect to each other are two handle attaching devices or threaded members 11. The threaded members 11 are secured to the side of the container 10 in any suitable manner, such as by riveting or welding, or in some instances they may be in the form of screw bosses integral with the wall of the container. Each threaded member comprises a retainer piece provided with a raised or embossed portion 12 which is of sufficient depth to receive a threaded nut 13 fixed thereto and adapted to receive the end of an attaching screw 14.

In Figs. 2, 3 and 4 of the drawings, illustrating one embodiment of the invention, there is shown a generally U-shaped metal attaching member 15. The attaching member 15 is secured at its upper end to a handle 16 which extends outwardly from the container 10 and terminates in a downwardly extending hand grip portion 17. The U-shaped member 15 is formed preferably of a continuous piece of heavy gage wire, the free ends of which are bent outwardly as shown in Fig. 2 and are extended into the handle 16 and gripping portion 17. The handle may be formed of suitable low heat conducting material, such as plastic material, rubber or wood. It is desirable that the wire be extended into and secured within the handle and gripping portion to lend strength thereto so that the handle will not bend while lifting a filled container. If the handle comprises plastic material or rubber formed by a molding process, it is preferable to insert the wire in the handle during the molding thereof. The U-shaped attaching member 15 may be attached to the container in the manner shown in Fig. 4. Washers or clips 18 having bent ends 18a are adapted to bear against and embrace the wire of the attaching member 15. A suitable hole is provided in each of the washers 18 through which the screws 14 may be extended into the nuts 13 to draw the attaching member 15 tightly against the embossed portions 12 of the attaching device 11.

In the above construction it should be noted that the handle may be readily secured to the attaching devices or threaded members 11 irrespective of the distance said members may be spaced apart upon the container. Limited vertical adjustment of the handle upon the container to a desired height may also be easily obtained by loosening the screws 14. It should be noted further that the hand grip portion 17 of the handle 16 extends downwardly and outwardly away from the container or percolator and remote from the flame of an open burner of a stove. The handle, therefore, is always cool and may be grasped by the hand without need of an additional holder.

Referring to Figs. 6 and 7 of the drawing there is shown, by way of illustration, another embodiment of the invention. In this embodiment a generally U-shaped handle 19 is provided which may be formed of any suitable low heat conducting material, such as plastic material, rubber or wood. At its ends the handle 19 is provided with metal attaching members 20 and 21 formed of strip metal and provided with elongate slots 22 and 23. The upper ends of the attaching members 20 and 21 are bent outwardly and inserted within the ends of the handle 19. It is desirable, if the handle 19 is formed of molded plastic material, to secure the attaching members thereto during the molding process. The slotted portions of the members 20 and 21 are adapted for adjustable attachment to the threaded members 11. To accomplish this, flat washers 24 having holes therein are interposed between the screws 14 and the attaching members. The screws 14 are then inserted through the slots 22 and 23 and threaded into the nuts 13 within the embossed portions 12 in such manner as to draw the attaching members 20 and 21 tightly against the embossed portions 12.

There is illustrated in Figs. 8 and 9 in the drawings another embodiment of the invention. In this embodiment the attaching member 25 is constructed in the form of a metal bar or strip which at its ends is provided with elongate slots 26 and 27 which are adapted to adjustably receive the screws 14. The upper end of the attaching member is bent outwardly and is suitably secured within an outwardly and upwardly extending handle 28 which is formed of a low heat conducting material. The attaching member 25 may be secured to the threaded members 11 of the container 10 by means of the screws 14, washers 24 being interposed between the screws and the attaching member.

In all embodiments of the invention at least three important features lend to the handle a high degree of utility: (1) it is readily adaptable for interchangeable attachment to containers, percolators and the like having fixed handle supporting members spaced vertically thereon at varying distances apart; (2) it may be quickly and easily adjusted in height to a desired position, and (3) the hand grip portion of each handle is remote from the flame when the container or percolator is placed over an open burner.

I claim:

1. In a replacement handle for a coffee pot or the like having vertically spaced handle attachment means, a wire formed handle support having paired spaced upright parallel legs adapted at their upper ends for attachment with a handle grip member, said support being adapted for attachment to said pot by clamping means passing between said wire legs, and a handle grip member adapted to be connected at one end to the upper ends of said wire legs and to be spaced from the latter except at the connection thereto.

2. In a replacement handle for a coffee pot or the like having vertically spaced handle attachment means, a wire formed handle support having paired spaced upright parallel legs adapted for attachment to said pot by clamping means passing between said wire legs, and a handle grip member connected at one end to the upper end of the support and spaced from the latter except at the upper connection thereto.

3. In a replacement handle for a coffee pot or the like provided with vertically spaced handle attachment means, a U-shaped wire formed handle support having parallel vertical members adapted to extend along opposite sides of said attachment means, a hand grip, said support having outwardly bent upper ends embedded in said hand grip and being detachably connected to said pot by clamping means insertable between said members.

OSCAR E. NELSON.

REFERENCES CITED

The following references are of record in the file of this patent:

UNITED STATES PATENTS

| Number | Name | Date |
| --- | --- | --- |
| 393,533 | Blue | Nov. 27, 1888 |
| 404,666 | Williamson | June 4, 1889 |
| 903,797 | Simpson | Nov. 10, 1908 |
| 971,876 | Apple | Oct. 4, 1910 |
| 1,136,718 | Possons | Apr. 20, 1915 |
| 1,446,137 | Thompson | Feb. 20, 1923 |
| 1,732,940 | Larson | Oct. 22, 1929 |
| 2,044,682 | Gust | June 16, 1936 |